(12) United States Patent
Sato (10) Patent No.: US 7,096,086 B2
(45) Date of Patent: Aug. 22, 2006

(54) APPARATUS, METHOD AND PROGRAM FOR GENERATING A RECIPE FOR AN INSPECTION TOOL

(75) Inventor: Yoshiyuki Sato, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/232,852

(22) Filed: Sep. 23, 2005

(65) Prior Publication Data

US 2006/0077387 A1 Apr. 13, 2006

(30) Foreign Application Priority Data

Sep. 27, 2004 (JP) .......................... P2004-280056

(51) Int. Cl.
*G06F 19/00* (2006.01)
(52) U.S. Cl. ..................... 700/108; 716/716; 716/4
(58) Field of Classification Search ........ 700/108–110; 716/4, 19
See application file for complete search history.

(56) References Cited

U.S. PATENT DOCUMENTS

| 6,583,870 | B1 * | 6/2003 | Noda ...................... 356/237.5 |
| 2005/0022932 | A1 * | 2/2005 | Kagoshima et al. ... 156/345.24 |
| 2005/0160394 | A1 * | 7/2005 | Bevis ......................... 716/19 |
| 2006/0025948 | A1 * | 2/2006 | Coldren et al. ............... 702/83 |

* cited by examiner

*Primary Examiner*—Zoila Cabrera
(74) *Attorney, Agent, or Firm*—Finnegan, Henderson, Farabow, Garrett & Dunner, L.L.P.

(57) ABSTRACT

An apparatus for generating a recipe for an inspection tool includes an extracting module extracting recipe parameters to be set to the inspection tool from among a group of recipe, a recipe candidate generator generating recipe candidates by combining settings of recipe parameters, a calculator calculating detecting parameters for each of the recipe candidates by inspecting a product using the inspection tool to which each of the recipe candidate is applied; and a recipe selecting module selecting a recipe candidate as a recipe for the inspection tool from among the recipe candidates.

20 Claims, 5 Drawing Sheets

APPARATUS, METHOD AND PROGRAM FOR GENERATING A RECIPE FOR AN INSPECTION TOOL

CROSS REFERENCE TO RELATED APPLICATIONS AND INCORPORATION BY REFERENCE

This application is based upon and claims the benefit of priority from prior Japanese Patent Application P2004-280056 filed on Sep. 27, 2004; the entire contents of which are incorporated by reference herein.

BACKGROUND OF THE INVENTION

1. Field of the Invention

The present invention relates to an apparatus, a method, and a program for generating a recipe for an inspection tool used to inspect a product.

2. Description of the Related Art

Recipe parameters, which specify operations of an inspection tool used in each inspection process, are set to inspection tools for inspecting a product. A combination of a plurality of recipe parameter settings is referred to as a 'recipe'. An engineer combines many recipe parameters and repeats inspection and defect review so as to generate a recipe. 'Defect review' is a process to confirm defects by examining the defects detected by an inspection tool using a microscope or the like. A combination of recipe parameter settings, which satisfy an inspection condition required of the inspection tool, is selected as a recipe. Inspection conditions include size of defects to be detected and inspection time or the like.

However, a trial-and-error method for generating a recipe by an engineer is inefficient. In addition, recipes may often be generated from subjective judgments of an engineer based on his/her knowledge and experience. This creates a difference in recipe quality due to the skills of engineers. As a result, a serious defect may not be detected.

SUMMARY OF THE INVENTION

An aspect of the present invention inheres in an apparatus for generating a recipe for an inspection tool. The apparatus includes an extracting module configured to extract a plurality of recipe parameters to be set to the inspection tool from among a group of recipe parameters, based on inspection information; a recipe candidate generator configured to generate a plurality of recipe candidates by combining a plurality of settings of the recipe parameters; a calculator configured to calculate detecting parameters for each of the recipe candidates by inspecting a product using the inspection tool to which each of the recipe candidate is applied; and a recipe selecting module configured to select a recipe candidate as a recipe from among the recipe candidates so that the recipe has the detecting parameters that satisfy an inspection condition.

Another aspect of the present invention inheres in a computer implemented method for generating a recipe for an inspection tool. The method includes extracting a plurality of recipe parameters to be set to the inspection tool from among a group of recipe parameters, based on inspection information; generating a plurality of recipe candidates by combining a plurality of settings of the recipe parameters; calculating detecting parameters for each of the recipe candidates by inspecting a product using the inspection tool to which each of the recipe candidate is applied; and selecting a recipe candidate as a recipe from among the recipe candidates so that the recipe has the detecting parameters that satisfy an inspection condition.

Still another aspect of the present invention inheres in a computer program product for generating a recipe for an inspection tool. The program includes instructions configured to extract a plurality of recipe parameters to be set to the inspection tool from among a group of recipe parameters, based on inspection information; instructions configured to generate a plurality of recipe candidates by combining a plurality of settings of the recipe parameters; instructions configured to calculate detecting parameters for each of the recipe candidates by inspecting a product using the inspection tool to which each of the recipe candidate is applied; and instructions configured to select a recipe candidate as a recipe from among the recipe candidates so that the recipe has the detecting parameters that satisfy an inspection condition.

DETAILED DESCRIPTION OF THE INVENTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set forth such as specific signal values, etc., to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

First Embodiment

Figure 1:
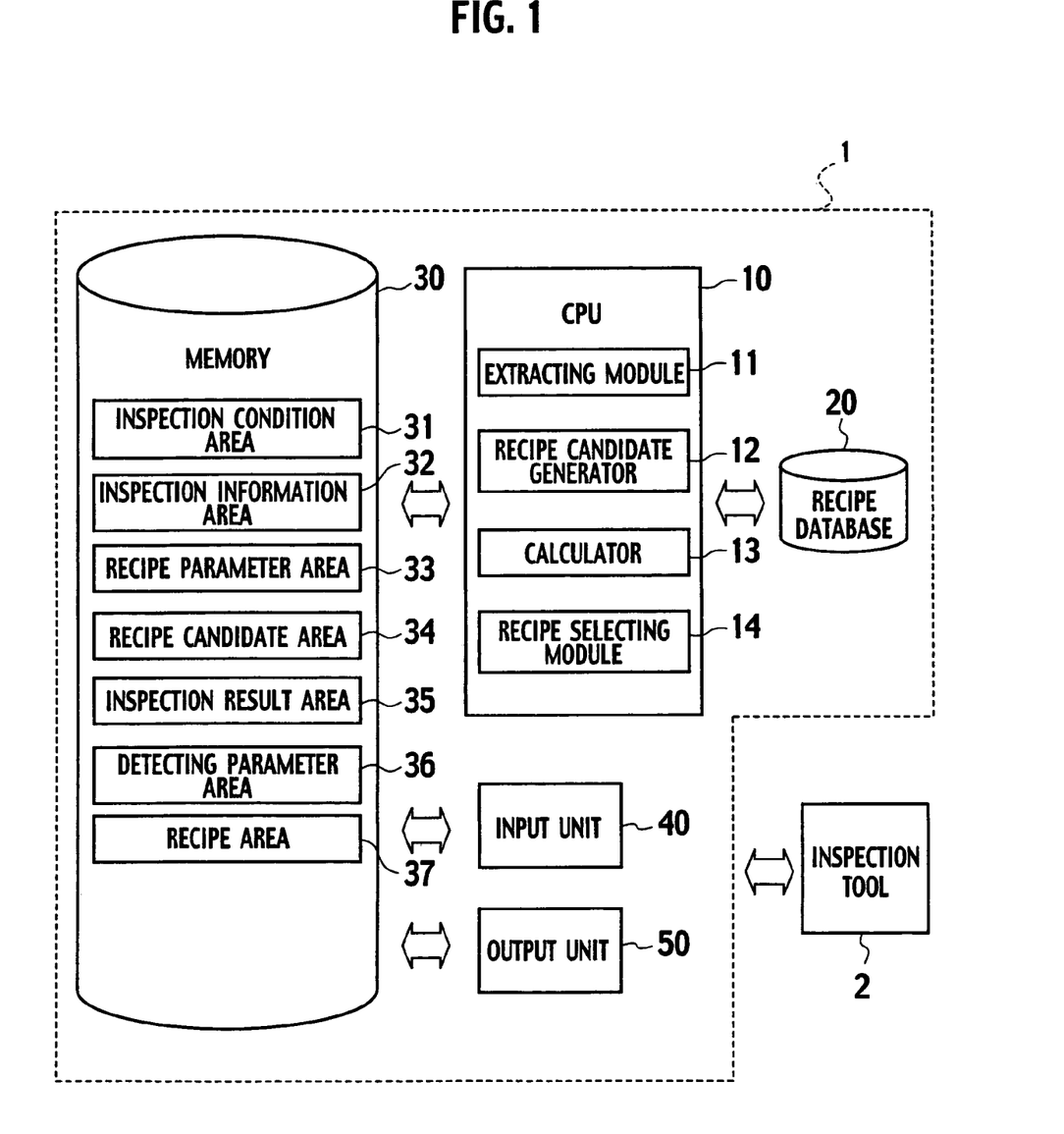
FIG. 1 shows a schematic structure of a recipe generating apparatus, according to a first embodiment of the present invention.

As shown in FIG. 1, a recipe generating apparatus 1, according to the first embodiment of the present invention, includes a central processing unit (CPU) 10, a recipe database 20, a storage unit 30, an input unit 40, and an output unit 50.

The CPU 10 includes an extracting module 11, a recipe candidate generator 12, a calculator 13, and a recipe selecting module 14. The extracting module 11 extracts a plurality of recipe parameters, which are set to an inspection tool 2 shown in FIG. 1, from among a group of recipe parameters, based on inspection information. The recipe candidate generator 12 generates a plurality of recipe candidates by combining a plurality of settings of the recipe parameters. The calculator 13 calculates detecting parameters for each recipe candidate, based on inspection results obtained by inspecting a product using the inspection tool 2 to which the recipe candidate is applied. The recipe selecting module 14 selects a recipe candidate as a recipe for the inspection tool 2 from among a group of recipe candidates. The selected recipe candidate has the detecting parameters that satisfy an inspection condition.

'Inspection information' includes a plurality of pieces of information of the inspection tool used for a plurality of inspection processes, a plurality of pieces of information of recipe parameters for each inspection tool, a plurality of pieces of information of inspection areas of the product to be inspected or the like. Information of inspection areas of the product includes positions that specify inspection areas and sizes of inspection areas.

'Detecting parameter' includes an average number of defects for each defect size resulting from repeating an inspection ten times, for example, and reproducibility of inspection results. Reproducibility of inspection results may be calculated as the probability of each defect for each defect size being repeatedly detected.

'Inspection condition' includes inspection time per wafer, standard defect size for detection, and reliability of inspection. When reliability of inspection is considered an inspection condition, the inspection condition of 'reproducibility of inspection results is 80% or greater when inspection is repeated ten times' is specified. When the inspection tool 2 is used in a plurality of inspection processes, inspection conditions are specified for the plurality of the inspection processes, respectively.

The recipe database 20 is a storage unit, which stores a group of recipe parameters. When the inspection tool 2 is used in a plurality of inspection processes, the recipe database 20 stores a group of recipe parameters for each inspection process. The group of recipe parameters includes parameters that specify the operation of respective inspection tools. Therefore, the recipe parameters are stored in the recipe database 20 for each inspection tool and for each inspection process.

The storage unit 30 includes an inspection condition area 31, an inspection information area 32, a recipe parameter area 33, a recipe candidate area 34, an inspection result area 35, a detecting parameter area 36, and a recipe area 37.

The inspection condition area 31 stores an inspection condition required by the inspection tool 2.

The inspection information area 32 stores inspection information of the product. For example, inspection of a semiconductor product manufacturing process may be carried out for just a part of a wafer instead of the entire wafer. In such a case, information of inspection area of the wafer is stored in the inspection information area 32.

The recipe parameter area 33 stores recipe parameters set to the inspection tool 2. The recipe candidate area 34 stores recipe candidates generated by the recipe candidate generator 12. The inspection result area 35 stores inspection results obtained by inspecting the product using the inspection tool 2. The detecting parameter area 36 stores detecting parameters calculated by the calculator 13. The recipe area 37 stored recipes selected by the recipe selecting module 14.

A person who generates a recipe uses the input unit 40 to specify a target inspection tool and enter commands for executing or aborting recipe generating. In addition, a person who generates a recipe may enter and modify information to be stored in the recipe database 20 or the like, via the input unit 40. Therefore, the input unit 40 includes a keyboard, a mouse pointer, a light pen, and a flexible disk unit or other equivalent elements.

In addition, the output unit 50 includes a display and a printer, which display recipe contents, or a recording unit, which stores information in a computer readable recording medium. A 'computer readable recording medium' refers to a medium such as an external storage unit for a computer, a semiconductor memory, a magnetic disk, or an optical disk, which may store electronic data. More specifically, a 'computer readable recording medium' may be a flexible disk, a compact disk read only memory (CD-ROM), or a magneto-optics (MO) disk.

Figure 2:
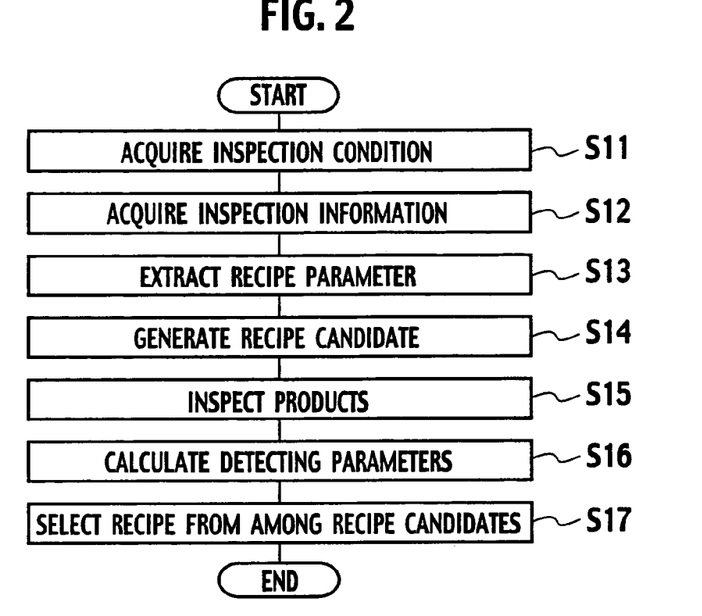
FIG. 2 is a flowchart explaining an automatic recipe generating method, according to the first embodiment of the present invention.

An example of generating a recipe for the inspection tool 2 by the recipe generating apparatus 1 shown in FIG. 1 is described forthwith by referring to the flowchart of FIG. 2.

In step S11, an inspection condition is stored in the inspection condition area 31 via the input unit 40 shown in FIG. 1. In step S12, inspection information is stored in the inspection information area 32 via the input unit 40.

Figure 3:
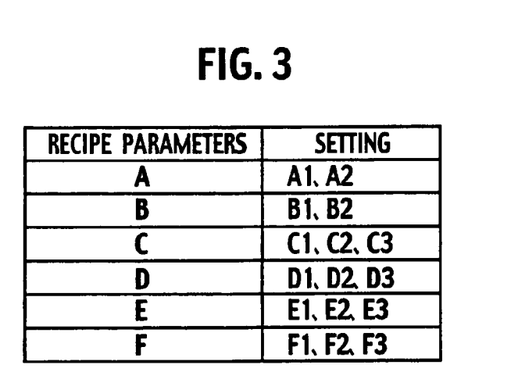
FIG. 3 shows exemplary recipe parameters extracted using the automatic recipe generating method, according to the first embodiment of the present invention.

In step S13, the extracting module 11 reads the inspection information from the inspection information area 32. The extracting module 11 extracts recipe parameters, which are set to the inspection tool 2, from among the group of recipe parameters stored in the recipe database 20, based on the inspection information. Exemplary recipe parameters are shown in FIG. 3. For example, if the inspection tool 2 is a defect detection tool, recipe parameters A through F shown in FIG. 3 include pixel size and focusing offset value to be set to the defect detection tool. A plurality of settings for the recipe parameters A through F may be applied to an inspection process for generating a recipe. For example, as shown in FIG. 3, the recipe parameter A may be set to setting A1 or setting A2. The extracted recipe parameters are stored in the recipe parameter area 33.

Figure 4:
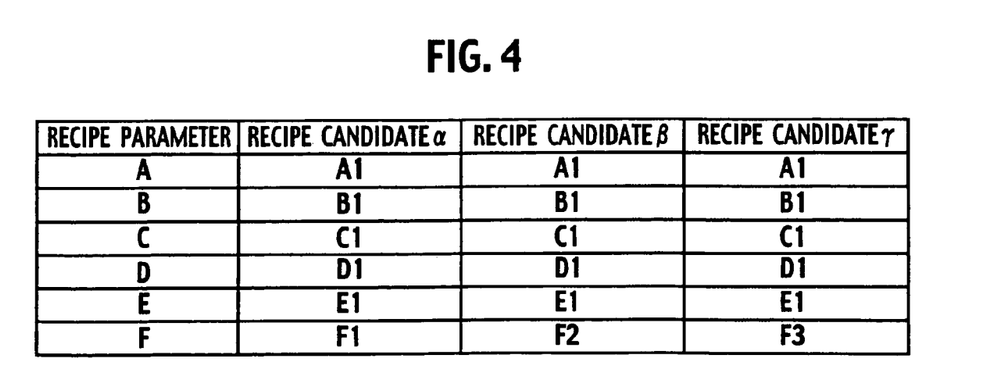
FIG. 4 shows exemplary recipe candidates generated using the automatic recipe generating method, according to the first embodiment of the present invention.

In step S14, the recipe candidate generator 12 reads the recipe parameter from the recipe parameter area 33. The recipe candidate generator 12 generates a plurality of recipe candidates by combining all settings of the recipe parameters, which are read from the recipe parameter area 33. The generated recipe candidates are stored in the recipe candidate area 34. Exemplary recipe candidates are shown in FIG. 4. The recipe candidates α through γ shown in FIG. 4 are part of recipe candidates generated by combining the settings of the recipe parameters A through F shown in FIG. 3. As shown in FIG. 4, the recipe candidates α through γ differ from one another only in the setting of the recipe parameter F. The recipe candidates stored in the recipe candidate area 34 may be transferred to the inspection tool 2 via the output unit 50.

In step S15, all recipe candidates stored in the recipe candidate area 34 are applied or set to the inspection tool and inspection areas of the product are inspected using the inspection tool 2. The product is inspected under the same condition as the inspection condition. For example, when the inspection condition is: 'reproducibility of inspection results is 80% or greater when inspection is repeated ten times', inspection areas are repeatedly inspected ten times for each recipe candidate. The inspection results are stored in the inspection result area 35 via the input unit 40.

In step S16, the calculator 13 reads the inspection results from the inspection result area 35. The calculator 13 calculates detecting parameters for each recipe candidate, based on the inspection results. The calculated detecting parameters are stored in the detecting parameter area 36. Exemplary detecting parameters are shown in FIGS. 5A through 5C, and 6A through 6C. Vertical axes of FIGS. 5A through 5C indicate average numbers $D_\alpha(X)$, $D_\beta(X)$, and $D_\gamma(X)$ of crystal defects detected in wafer by inspection, based on the recipe candidates α through γ. Horizontal axes of FIGS. 5A through 5C indicate size X of wafer crystal defects. Vertical axes of FIGS. 6A through 6C indicate respective reproducibility $R_\alpha(X)$, $R_\beta(X)$, and $R_\gamma(X)$ of the results of inspection, based on the recipe candidates a through γ, respectively. Horizontal axes of FIGS. 6A through 6C indicate size X of crystal defects.

In step S17, the recipe selecting module 14 reads the detecting parameters from the detecting parameter area 36. In addition, the recipe selecting module 14 reads the inspection condition for the respective detecting parameters from the inspection condition area 31. The recipe selecting module 14 selects a recipe candidate as a recipe. The selected recipe satisfies the inspection condition, based on the detecting parameters and corresponding inspection condition. More specifically, a recipe candidate is selected as a recipe for the inspection tool 2 from among the recipe candidates, in which detecting parameters that satisfy a required inspection condition are calculated for the recipe candidate. The selected recipe is stored in the recipe area 37. The recipe stored in the recipe area 37 may be read externally from the recipe generating apparatus 1 via the output unit 50.

Figure 5A:
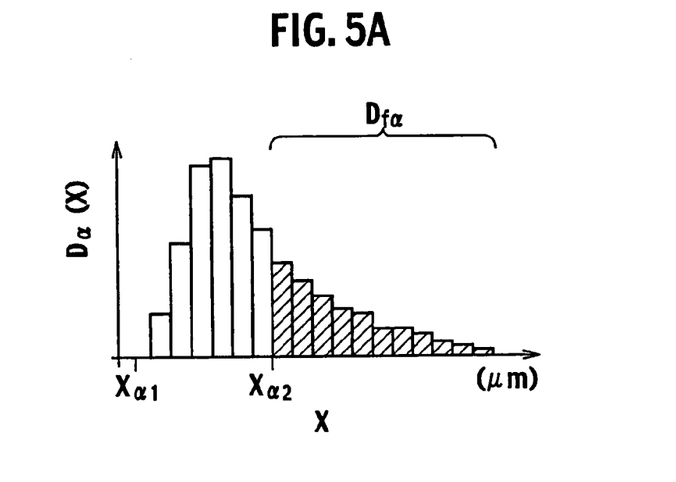
FIGS. 5A through 5C are graphs showing exemplary detecting parameters calculated using the automatic recipe generating method, according to the first embodiment of the present invention.
Figure 5B:
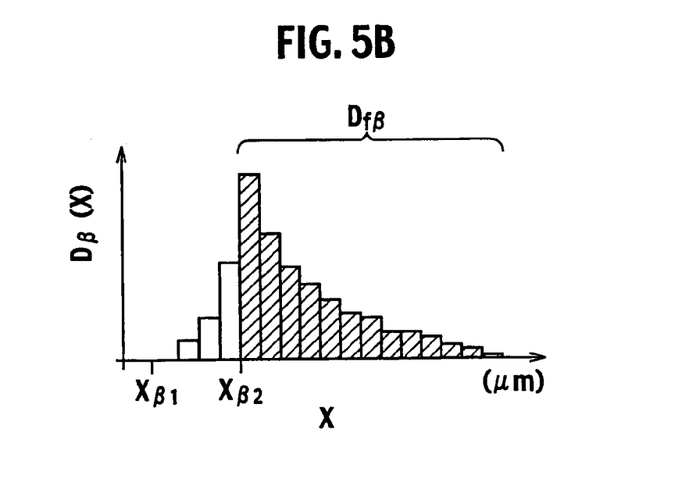
Figure 5C:
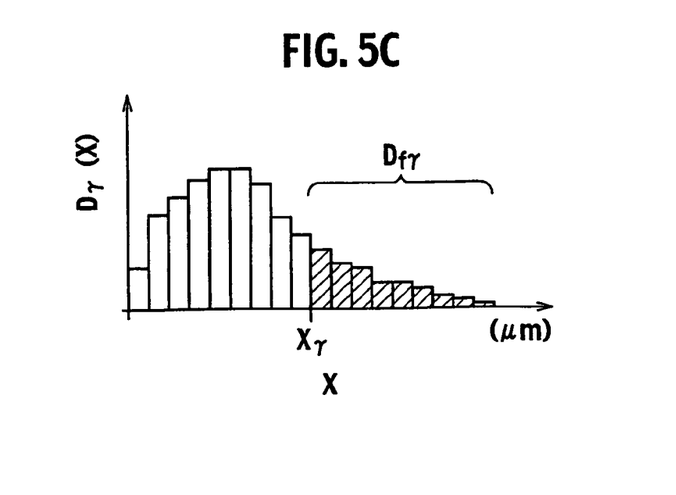
Figure 6A:
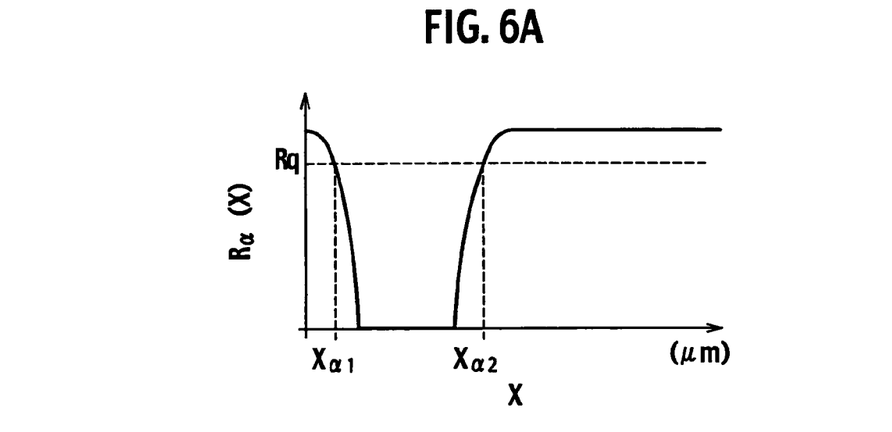
FIGS. 6A through 6C are graphs showing other exemplary detecting parameters calculated using the automatic recipe generating method, according to the first embodiment of the present invention.
Figure 6B:
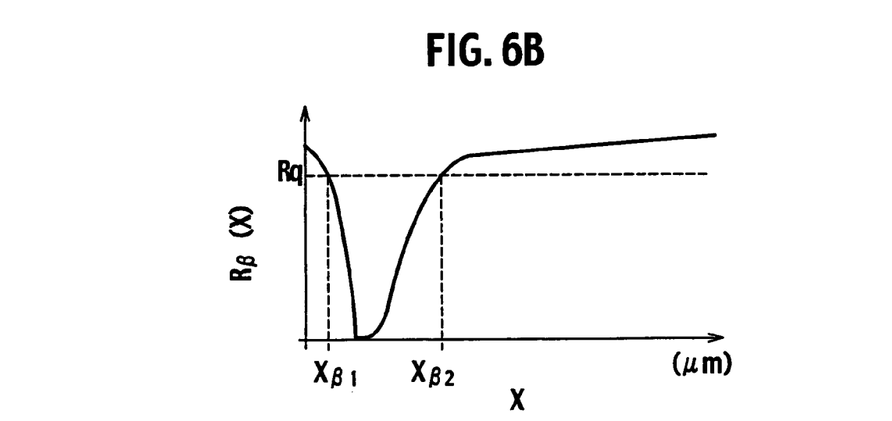
Figure 6C:
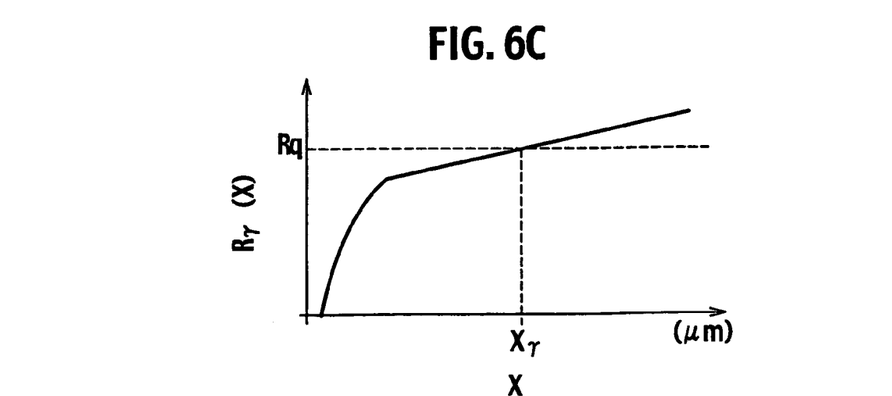

In general, the larger the crystal defect size X, the higher the reproducibilities $R_\alpha(X)$, $R_\beta(X)$, and $R_\gamma(X)$ shown in FIGS. 6A through 6C. However, in the case of inspection using the recipe candidate α, detecting defects of size $X_\alpha 1$ or less is impossible. Therefore, as shown in FIG. 5A, the number of detected crystal defects of size $X_\alpha 1$ or less is always zero. As a result, as shown in FIG. 6A, the reproducibility $R_\alpha(X)$ is high where the size is $X_\alpha 1$ or less. Similarly, in the case of inspection using the recipe candidate β, the reproducibility $R_\beta(X)$ is high where the size is $X_\beta 1$ or less. Therefore, both the reproducibility and also the number of defects must be considered for selecting a recipe for an inspection tool to correctly detect defects. An example of selecting a recipe for the inspection tool 2 based on the detecting parameters shown in FIGS. 5A through 5C and 6A through 6C is described forthwith.

In the step S17, when the detection condition is: 'the reproducibility of inspection results is 80% or greater and detecting as many defects as possible is required', a recipe candidate with the largest sum of the detected number of crystal defects of size X and a reproducibility of 80% or greater is selected. In the case of inspection using the recipe candidate α, size X of the crystal defects with a reproducibility $R_\alpha(X) \geq Rq$, as a required inspection result, is:

$X \leq X_\alpha 1$ or $X \geq X_\alpha 2$, as shown in FIG. 6A. Therefore, the number of crystal defects detected through inspection by using the recipe candidate a with a reproducibility $R_\alpha(X) \geq Rq$ is the sum ($=D_{f_\alpha}$) of the number of defects indicated by shaded regions in FIG. 5A.

In the case of inspection using the recipe candidate the size X of the crystal defects with a reproducibility $R_\beta(X) \geq Rq$ as a required inspection result is:

$X \leq X_\beta 1$ or $X \geq X_\beta 2$, as shown in FIG. 6B. Therefore, the number of crystal defects detected through inspection using the recipe candidate β with a reproducibility $R_\beta(X) \geq Rq$ is the sum ($=D_{f_\beta}$) of the number of defects indicated by shaded regions in FIG. 5B.

As shown in FIG. 6C, in the case of an inspection using the recipe candidate γ, size X of the crystal defects with a reproducibility $R_\gamma(X) \geq Rq$ as a required inspection result, is:

$X \geq X_\gamma$.

Therefore, the number of crystal defects detected through inspection using the recipe candidate γ with a reproducibility $R_\gamma(X) \geq Rq$ is the sum ($=D_{f_\gamma}$) of the number of defects indicated by shaded regions in FIG. 5C.

For example, if the relationship: $D_{f_\beta} > D_{f_\alpha} > D_{f_\gamma}$ is satisfied, the recipe candidate β is selected as a recipe having a reproducibility Rq or greater as an inspection result and is the largest detected number of crystal defects.

There is a low probability that pseudo defects, erroneously detected by the defect detection tool, will be repeatedly detected and there is a low probability that defects of a size close to the limit for the inspection tool 2 to detect will also be repeatedly detected. Therefore, the use of reproducibility of inspection results, as an inspection condition, provides for a highly reliable inspection recipe for which sizes of target defects to be detected are specified. Accordingly, defect review for verification of defects is unnecessary.

As described above, according to the recipe generating apparatus 1 shown in FIG. 1, a recipe may be generated that provide, inspection results that satisfy an inspection condition required by the inspection tool 2 irrespective of the skills of a person who generates the recipe. Therefore, providing a recipe using the aforementioned method achieves stable detection of defects in manufacturing lines. In addition, generating recipes is possible without defect review, resulting in reduction of the time required for generating recipe. In other words, defects occur in manufacturing processes of the product may be detected at an early stage and appropriate countermeasures may be taken. As a result, the aforementioned recipe generating method, used in manufacturing processes of the product, reduces the random performance of the product and improves the product yield in a short time.

A series of recipe generating operations shown in FIG. 2 may be carried out by controlling the recipe generating apparatus 1, shown in FIG. 1, by use of a program having an algorithm equivalent to that shown in FIG. 2. This program should be stored in the memory 30 of the recipe generating apparatus 1 shown in FIG. 1. In addition, a series of recipe generating operations of the present invention may be carried out by storing such program in a computer-readable recording medium and instructing the memory 30, shown in FIG. 1, to read the recording medium.

Second Embodiment

Figure 7:
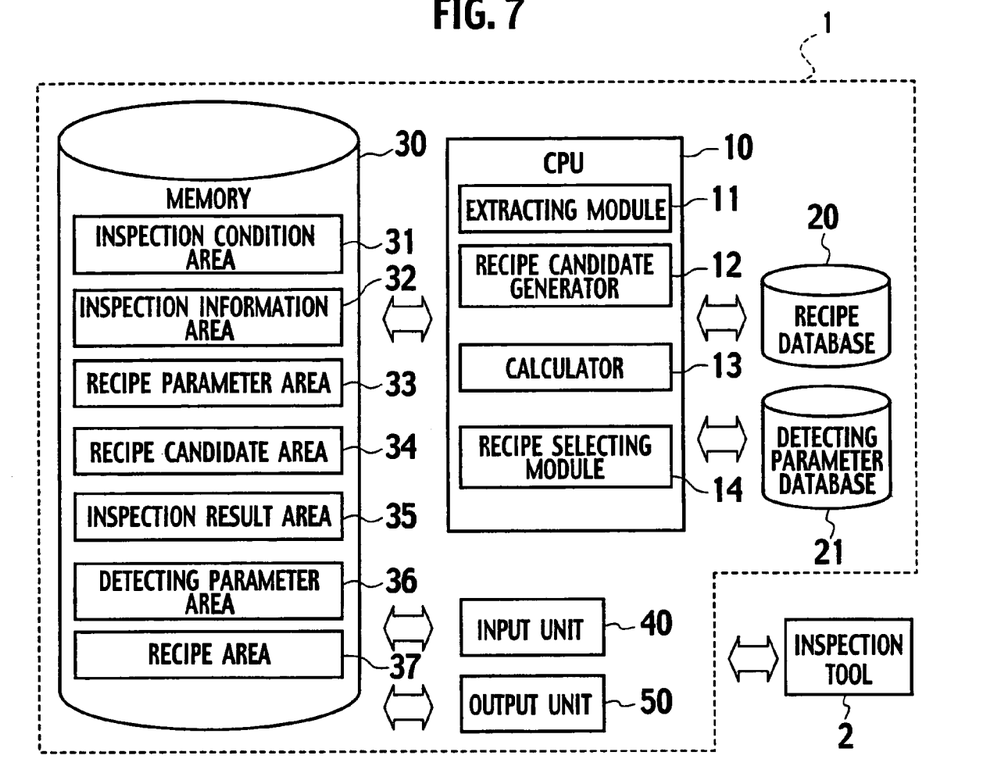
FIG. 7 shows a schematic structure of a recipe generating apparatus, according to a second embodiment of the present invention.

As shown in FIG. 7, a recipe generating apparatus 1A, according to the second embodiment of the present invention, differs from the recipe generating apparatus 1 shown in FIG. 1 by further including a detecting parameter database 21. The other elements are the same as that of the first embodiment shown in FIG. 1. The detecting parameter database 21 is a storage unit, which stores detection parameters calculated by a calculator 13. The detection parameters are stored for each recipe candidate.

Figure 8:
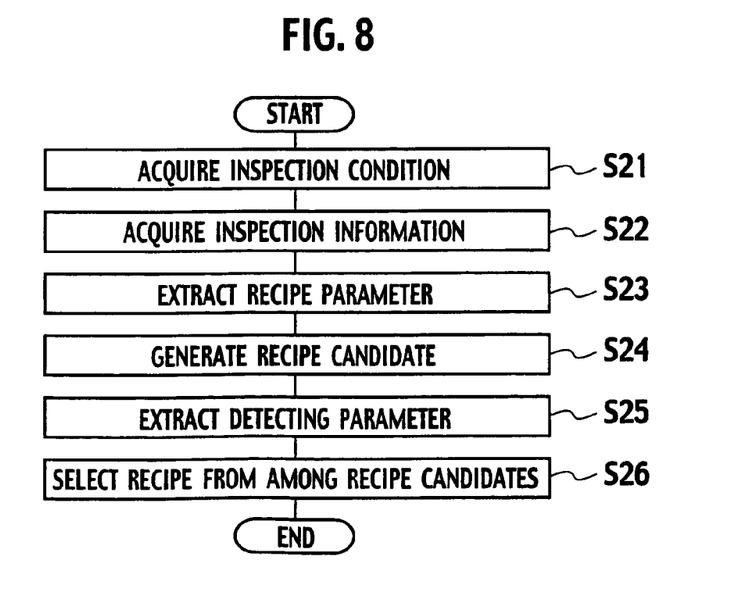
FIG. 8 is a flowchart explaining an automatic recipe generating method, according to the second embodiment of the present invention.

An example of generating recipes by the recipe generating apparatus 1A, shown in FIG. 7, is described forthwith using a flowchart shown in FIG. 8.

In steps S21 through S24, a plurality of recipe candidates are generated by combining all settings of the recipe parameters for the inspection tool 2 as with the method described using the flowchart in FIG. 2. The generated recipe candidates are stored in the recipe candidate area 34.

In step S25, the recipe selecting module 14 reads a recipe candidate from the recipe candidate area 34. The recipe selecting module 14 extracts the detecting parameters, which are calculated from inspection results using the recipe candidates, for each recipe candidate from the detecting parameter database 21. The extracted detecting parameters are stored in a detecting parameter area 36.

In step S26, the recipe selecting module 14 reads the detecting parameter from the detecting parameter area 36. In addition, the recipe selecting module 14 reads the inspection condition from the inspection condition area 31. The recipe selecting module 14 selects a recipe, which satisfies the required inspection condition, from the recipe candidates as with the method described in the first embodiment. The selected recipe is stored in the recipe area 37.

The recipe generating apparatus 1A, shown in FIG. 7, generates recipes using pre-calculated detecting parameters. This reduces the recipe generating time. In the case of a new recipe candidate which is not yet applied or set to inspect the product, detecting parameters calculated from the inspection results to which the new recipe candidate is applied are not yet stored in the detecting parameter database 21. In such a case, detecting parameters may be calculated as with the method described in the first embodiment. The calculated detecting parameters are stored in the detecting parameter database 21.

In addition, according to the recipe generating apparatus 1A, information of defects detected by each inspection tool 1A or in each inspection process may be obtained by analysis of the detecting parameters stored in the detecting parameter database 21. The causes of defects may be investigated using information of defects for each inspection tool or for each inspection process. This investigation improves the yield of the product.

Since the remainder of the operation of the second embodiment is substantially the same as that of the first embodiment, repetitive description thereof is omitted.

Other Embodiments

In the description of the first and the second embodiment, an example where an inspection condition required for the inspection tool 2 and inspection information of the product, inspection processes, and inspection areas of the product are stored in the storage unit 30 via an input unit 40 has been described. Alternatively, inspection conditions and inspection information may be read from a database, which is pre-stored with inspection conditions and inspection information, and then transferred to and stored in the storage unit 30.

In addition, it may be easily understood from the aforementioned description that the present invention may be applied to a recipe generating process for semiconductor device inspecting tools, automobile inspecting tools, chemical inspecting tools, building component inspecting tools or related tools.

Various modifications will become possible for those skilled in the art after receiving the teachings of the present disclosure without departing from the scope thereof.

What is claimed is:

1. An apparatus for generating a recipe for an inspection tool, comprising:
    an extracting module configured to extract a plurality of recipe parameters to be set to the inspection tool from among a group of recipe parameters, based on inspection information;
    a recipe candidate generator configured to generate a plurality of recipe candidates by combining a plurality of settings of the recipe parameters;
    a calculator configured to calculate detecting parameters for each of the recipe candidates by inspecting a product using the inspection tool to which each of the recipe candidate is applied; and
    a recipe selecting module configured to select a recipe candidate as a recipe from among the recipe candidates so that the recipe has the detecting parameters that satisfy an inspection condition.

2. The apparatus of claim 1, wherein the inspection information includes a plurality of pieces of information of the inspection tool used in for a plurality of inspection processes, respectively.

3. The apparatus of claim 1, wherein the product is inspected under the same condition as the inspection condition, before the detecting parameters are calculated.

4. The apparatus of claim 1, wherein the detecting parameters include reproducibility of the inspection results.

5. The apparatus of claim 1, wherein inspection conditions are specified for a plurality of inspection processes, when the inspection tool is used in the plurality of inspection processes, respectively.

6. The apparatus of claim 1, further comprising:
    a recipe database configured to store the group of recipe parameters.

7. The apparatus of claim 6, wherein the group of recipe parameters is stored in the recipe database for each inspection process, when the inspection tool is used in a plurality of inspection processes, respectively.

8. The apparatus of claim 1, further comprising:
    a detecting parameter database configured to store the detecting parameters.

9. The apparatus of claim 8, wherein the detecting parameter database stores the detecting parameters for each recipe candidate.

10. A computer implemented method for generating a recipe for an inspection tool, comprising:
    extracting a plurality of recipe parameters to be set to the inspection tool from among a group of recipe parameters, based on inspection information;
    generating a plurality of recipe candidates by combining a plurality of settings of the recipe parameters;

calculating detecting parameters for each of the recipe candidates by inspecting a product using the inspection tool to which each of the recipe candidate is applied; and selecting a recipe candidate as a recipe from among the recipe candidates so that the recipe has the detecting parameters that satisfy an inspection condition.

11. The method of claim 10, wherein the inspection information includes a plurality of pieces of information of the inspection tool used for a plurality of inspection processes, respectively.

12. The method of claim 10, wherein the product is inspected under the same condition as the inspection condition, before the detecting parameters are calculated.

13. The method of claim 10, wherein the detecting parameters include reproducibility of the inspection results.

14. The method of claim 10, wherein inspection conditions are specified for a plurality of inspection processes, when the inspection tool is used in the plurality of inspection processes, respectively.

15. The method of claim 10, further comprising:
extracting the plurality of recipe parameters from a recipe database configured to store the group of recipe parameters.

16. The method of claim 15, wherein the group of recipe parameters are stored in the recipe database for each inspection process, when the inspection tool is used in a plurality of inspection processes, respectively.

17. The method of claim 10, further comprising:
storing the detecting parameters in the detecting parameter database.

18. The method of claim 17, wherein the detecting parameters are stored in the detecting parameter database for each recipe candidate.

19. A computer program product embodied in a computer readable recording medium for generating a recipe for an inspection tool, comprising:

instructions configured to extract a plurality of recipe parameters to be set to the inspection tool from among a group of recipe parameters, based on inspection information;

instructions configured to generate a plurality of recipe candidates by combining a plurality of settings of the recipe parameters;

instructions configured to calculate detecting parameters for each of the recipe candidates by inspecting a product using the inspection tool to which each of the recipe candidate is applied; and instructions configured to select a recipe candidate as a recipe from among the recipe candidates so that the recipe has the detecting parameters that satisfy an inspection condition.

20. The computer program product embodied in a computer readable recording medium of claim 19, further comprising:

instructions configured to store the detecting parameters in a detecting parameter database.

* * * * *